(12) United States Patent
Cantrell et al.

(10) Patent No.: US 10,514,700 B2
(45) Date of Patent: Dec. 24, 2019

(54) SYSTEM AND METHOD FOR MANAGING A VEHICLE STORAGE AREA

(71) Applicant: Walmart Apollo, LLC, Bentonville, AR (US)

(72) Inventors: Robert Cantrell, Herndon, VA (US); Jeff Byrne, Rogers, AR (US); Elizabeth Fretheim, Bentonville, AR (US); Andrew B. Millhouse, Gilbert, AZ (US); Donald R. High, Noel, MO (US); Brian McHale, Oldham (GB); John J. O'Brien, Farmington, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/221,098

(22) Filed: Dec. 14, 2018

(65) Prior Publication Data

US 2019/0187716 A1  Jun. 20, 2019

Related U.S. Application Data (60) Provisional application No. 62/599,466, filed on Dec. 15, 2017.

(51) Int. Cl.
```
G05D 1/02       (2006.01)
B62D 13/06      (2006.01)
G05D 1/00       (2006.01)
```
(52) U.S. Cl.
CPC ........... *G05D 1/0225* (2013.01); *B62D 13/06* (2013.01); *G05D 1/0088* (2013.01); *G05D 2201/02* (2013.01)

(58) Field of Classification Search
CPC .............. G05D 1/0225; G05D 1/0088; G05D 2201/02; B62D 13/06
See application file for complete search history.

(56) References Cited

U.S. PATENT DOCUMENTS 4,378,072 A * 3/1983 Appleman ............ B66C 19/005
                                                              212/324
8,532,862 B2  9/2013 Neff
(Continued)

FOREIGN PATENT DOCUMENTS

WO  2013180622 A1  12/2013

OTHER PUBLICATIONS

International Search Report and Written Opinion dated Feb. 28, 2019, issued in corresponding PCT Application No. PCT/US2018/065690.

(Continued)

*Primary Examiner* — Nicholas Kiswanto
(74) *Attorney, Agent, or Firm* — Venable LLP; Jeffri A. Kaminski (57) ABSTRACT

An autonomous system for managing a vehicle storage area includes a control module configured to communicate, via an application program, with an autonomous yard truck. The control module instructs and facilitates the autonomous yard truck to move, dock, and/or store a trailer in the vehicle storage area. The autonomous yard truck includes a cab-less truck having a first end including a first trailer hookup and a second end including a second trailer hookup, a first set of sensors configured to position the autonomous yard truck in the vehicle storage area, a second set of sensors configured to maneuver the trailer, and a third set of sensors configured to prevent the autonomous truck from colliding with an object.

20 Claims, 8 Drawing Sheets

(56) References Cited

U.S. PATENT DOCUMENTS

| | | | |
|---|---|---|---|
| 9,656,806 B2* | 5/2017 | Brazeau | B65G 1/1378 |
| 10,065,799 B2* | 9/2018 | Einav | B65D 21/0235 |
| 2003/0233189 A1 | 12/2003 | Hsiao et al. | |
| 2016/0271800 A1* | 9/2016 | Stubbs | B25J 9/1666 |
| 2016/0368336 A1 | 12/2016 | Kahn et al. | |
| 2017/0031356 A1 | 2/2017 | Bell | |
| 2018/0364738 A1* | 12/2018 | Bridges | G05D 1/0287 |
| 2019/0064828 A1* | 2/2019 | Meredith | G05D 1/0088 |
| 2019/0064835 A1* | 2/2019 | Hoofard | G05D 1/0225 |
| 2019/0160675 A1* | 5/2019 | Paschall, II | B25J 9/1666 |

OTHER PUBLICATIONS

Nowak et al., "The era of digitized trucking & Transforming the Logistics Value Chain", PWC, 2016, pp. 1-24.

DHL, "Self-Driving Vehicles in Logistics", A DHL perspective on implications and use cases for logistics industry, 2014, pp. 1-39.

Louis Bedigian, "Autonomous Truck Startup TuSimple's Plan to Eliminate Drivers", Sep. 22, 2017, electronically retrieved from https://www.trucks.com/category/tech/autonomous-vehicles/ on Oct. 3, 2017. pp. 1-13.

Ron Derven, "Driverless Trucks" Oct. 3, 2017, NAIOP, 2015, electronically retrieved from https://www.naiop.org/en/Magazine/2015/Summer-2015/Business-Trends/Driverless-Trucks.aspx, on Oct. 3, 2017, pp. 1-3.

Intek, "What Can Self-Driving Trucks Mean to Warehouse Operations?", Feb. 8, 2017, electronically retrieved from http://www.intek.com/Blog/ID/99/What-Can-Self-Driving-Trucks-Mean-to-Warehouse-Operations, on Oct. 3, 2017. pp. 1-2.

Uber, "The Future of Trucking", Oct. 4, 2017, electronically retrieved from https://www.ubercom/info/atg/truck/, on Oct. 3, 2017, pp. 1-2.

* cited by examiner

SYSTEM AND METHOD FOR MANAGING A VEHICLE STORAGE AREA

PRIORITY

This application claims priority to U.S. Provisional Patent Application No. 62/599,466, filed Dec. 15, 2017, the contents of which are incorporated herein in their entirety.

BACKGROUND

1. Technical Field

The present disclosure relates to vehicle storage management. More specifically, the present disclosure relates to systems and methods for managing a vehicle storage area.

2. Introduction

Management of a vehicle storage area, for example a yard for storing trailers in a distribution center (DC) of a retailer or business, may account for four decision factors: space, time, material, and risk. Herein, space may refer to the yard and associated DC; time may refer to moves and sequences of moves; material may refer to the trailer and its contents; and risk may refer to the assortment of things that can go wrong ranging from inefficient positioning to lost trailers and collisions. An existing computer system for vehicle storage area management cannot efficiently and effectively account for the above four decision factors. For example, the space of the vehicle storage area may not be fully utilized; the time of moving a vehicle may be unreasonably long; a trailer may be positioned in a wrong parking spot; and collisions between vehicles may occur at an undesirable rate. As such, there is a need for a computer system for better, faster, safer, and less expensive yard management that can spend less on yard management operations to lower product prices for customers.

SUMMARY

Disclosed herein are autonomous systems for managing a vehicle storage area, which overcome at least some drawbacks known in the art. An example autonomous system for managing a vehicle storage area may include a control module having an application program installed thereon and configured to communicate, via the application program, with an autonomous cab-less yard truck. The control module may instruct and facilitate the autonomous cab-less yard truck to move, dock, and/or store a trailer in the vehicle storage area. The example system may also include the autonomous cab-less yard truck. The autonomous cab-less yard truck may have an application program installed thereon and be configured to communicate with the control module via the application program installed on the control module. The autonomous cab-less yard truck may include a first end including a first trailer hookup and a second end including a second trailer hookup, such that the trailer may be coupled with the autonomous cab-less yard truck via either the first trailer hookup or the second trailer hookup without turning around the autonomous cab-less yard truck. The autonomous cab-less yard truck may further include a first set of sensors configured to detect positions of the autonomous cab-less yard truck in the vehicle storage area; a second set of sensors configured to facilitate maneuvering the trailer; and a third set of sensors configured to prevent the autonomous cab-less truck from colliding with an object. The first, second, and third sets of sensors may be further configured to communicate, via the application program installed on the yard truck, with sensors installed in the vehicle storage area.

An exemplary method for automatically managing a vehicle storage area is also disclosed herein. The method may include detecting when a trailer is at a first location of the vehicle storage area and is ready to be positioned in a second location in the vehicle storage area; receiving an instruction, by an autonomous cab-less yard truck, from a control module to move the trailer, dock the trailer, and/or store the trailer in the second location in the vehicle storage area; positioning, based on the instruction and a plurality of sensors installed on the autonomous cab-less yard truck, the autonomous cab-less yard truck in the vehicle storage area; maneuvering, based on the instruction, the plurality of sensors installed on the autonomous cab-less yard truck, and a plurality of sensors installed on the trailer, the trailer by the autonomous cab-less yard truck; and preventing, based on the instruction and the plurality of sensors installed on the autonomous cab-less yard truck, the autonomous cab-less yard truck from colliding with an object. The autonomous cab-less yard truck may include a first end including a first trailer hookup and a second end including a second trailer hookup, such that the trailer is coupled with the autonomous cab-less yard truck via either the first trailer hookup or the second trailer hookup without turning around the autonomous cab-less yard truck; and the plurality of sensors installed on the autonomous cab-less yard truck. The plurality of sensors may include a first set of sensors configured for positioning the autonomous cab-less yard truck in the vehicle storage area; a second set of sensors configured for maneuvering the trailer; and a third set of sensors configured for preventing the autonomous cab-less yard truck from colliding with the object.

Another exemplary autonomous system for managing a vehicle storage area may also be provided. The autonomous system may include an autonomous cab-less yard truck having an application program installed thereon and configured to communicate with a control module via the application program to maneuvering a trailer, wherein the autonomous cab-less yard truck is further configured to have a first end including a first trailer hookup and a second end including a second trailer hookup, such that the trailer is coupled with the autonomous yard truck via either the first trailer hookup or the second trailer hookup without turning around the autonomous cab-less yard truck; a first set of sensors configured to detect positions the autonomous cab-less yard truck in the vehicle storage area; a second set of sensors configured to facilitate maneuvering the trailer; and a third set of sensors configured to prevent the autonomous cab-less yard truck from colliding with an object. The autonomous may further include a control module having an application program installed thereon and configured to communicate, via the application program installed thereon, with the autonomous cab-less yard truck, wherein the control module instructs and facilitates the autonomous cab-less yard truck to move, dock, and/or store the trailer in the vehicle storage area, based on the first, second, and third sets of sensors installed on the autonomous cab-less yard truck; and a plurality set of sensors installed in the vehicle storage area configured to communicate with the control module and the sensors installed on the autonomous cab-less truck for facilitating the autonomous cab-less truck to maneuvering the trailer.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Embodiments of this disclosure are illustrated by way of an example and not limited in the figures of the accompanying drawings, in which like references indicate similar elements and in which.

DETAILED DESCRIPTION

Various configurations and embodiments of the disclosure are described in detail below. While specific implementations are described, it should be understood that this is done for illustration purposes only. Other components and configurations may be used without parting from the spirit and scope of the disclosure.

In this disclosure, autonomous systems for managing a movement of vehicles within an area are provided. The area can be a regular automobile/car parking lot, or a yard for storing trailers in a distribution center of a retailer or business. The vehicle as used herein can include a car, a tractor, a trailer, a truck, a boat, or other types of vehicles.

In some embodiments, an autonomous yard management system is disclosed as an example autonomous system for managing a vehicle storage area. In such autonomous yard management system, an autonomous yard truck, for example, a cab-less autonomous yard truck, serves as the primary agent for executing instructions received from a computer system. The computer system may act as a control unit/module for the autonomous yard management system. The computer system may instruct the autonomous yard truck, for example, to move a trailer from a lot position to a location of a loading dock for loading/unloading the trailer. The autonomous yard truck may decide how to do it, based on, for example, its best pathway to accomplish its task, and the decisions of other autonomous yard trucks in the yard. Yard work can be performed/accomplished 24 hours/day and 7 days/week in such a system because the computer and the autonomous yard trucks do not need breaks and spare maintenance. The superior decisions and actions made as the computer and autonomous yard trucks assess both their instructions and the present state of a yard, can deliver better, faster, safer, and lower cost operations for yard management through superior use of space, time, material, and safety protocols. The control module may have an application program installed thereon for communicating with the yard truck and the trailer.

In some embodiments, an autonomous yard truck may be optimized for its purpose by forgoing elements required to support a human driver. Controls on the autonomous yard truck can be minimized, if not absent. For example, a cab-less backup system may allow a human to "drive" the autonomous yard truck like he/she might drive a remote control car. Without the cab, the autonomous yard truck may be flatter and can have two fronts instead of a back end and a front end. Two fronts herein means that the autonomous yard truck can have two hookups so that it may secure a trailer from either end of the autonomous yard truck without turning around. Superior control of the autonomous yard truck through automation also means that the yard truck can just as easily move a trailer by pushing it or pulling it, depending on a determination of the most efficient moves of the yard truck and/or the trailer.

In some embodiments, an array of sensors may be provided on the autonomous yard truck. Many sensors can serve multiple roles. These sensors may include, but not be limited to: sensors for localization, for example, onboard and/or off-board ways to determine the precise location of the autonomous yard truck along with angle and trajectory; sensors for performing tasks, specifically, sensors that allow the autonomous yard truck to handle its work, for example, to line itself up on a trailer, to line the trailer up to a dock, and to park the trailer; and sensors to avoid collisions, for example, sense and avoid sensors that detect stationary and/or moving objects that may collide with the autonomous yard truck or be collided into by the autonomous yard truck. The control module may communicate via the application program installed on the control module, with the sensors installed on the yard truck. The yard truck may be further provided an application program installed thereon for facilitating communications between the control module and the yard truck.

In some embodiments, sensors that may be based on image, tactile, magnetic, or energy wave, allow the autonomous yard truck to handle tasks needed for autonomous function. The tasks may be: normal driving that refers to moving point-to-point and conducting desired work tasks; crash avoidance that refers to avoiding collisions as the consequence of moving or being moved into; and hazards that refers to handling obstacles that may jeopardize the autonomous yard truck or trailer if engaged.

In some embodiments, the autonomous yard management system may account for the presence and absence of trailer by, for example, movement protocols (e.g., progress generally made with the yard truck out front), supplementary sensors, external observation sensors, and supplemental AGV at the rear as a guide.

In some embodiments, an engine for the autonomous yard truck may be a conventional fossil fuel engine or an engine with a myriad of new systems being developed such as hybrid, fuel cell, electric, or other system yet to be designed or envisioned. The transmission for the autonomous yard truck can be optimized for a shorter wheel base and for computer-based calibrations. The working body for the autonomous yard truck without a cab can be comparatively flat since it does not require a cab, and can be steered by a person remotely if necessary or preferred. As a yard truck without a cab is flat, it can easily have dual trailer hookups so that it can couple a trailer from either end without having to turn around.

The disclosed autonomous yard management systems can facilitate the following: associate safety, better trailer tracking, faster retrieval and maneuver of trailers, lower operational costs of yard management, and/or opportunity to cross-develop autonomous maneuver technology within a working but private domain.

In some embodiments, the disclosed systems herein may also offer advantages that include, but are not limited to, the following.

The disclosed systems may enable unnecessary parts to be removed. For example, automation can allow parts, such as a driver cab, to be removed from an autonomous yard truck. Removing parts can save space, reduce weight and lower maintenance cost.

The disclosed systems may enable unnecessary process steps to be removed. For example, it may remove steps in a process that accommodates human drivers, thereby removing elements in operations that may be prone to mistakes or accidents. For another example, an autonomous yard management system can always know and record exactly where and when a trailer is placed at a spot, thereby eliminating the need to search for inventory in the yard afterwards.

The disclosed systems may enable objects to be placed safely apart. An autonomous yard truck can keep itself and trailers apart from other objects with ever lower space margins required for the safety of people and property. For example, an autonomous yard truck can have the capacity to put trailers closer together than a human driver realistically can.

The disclosed systems may enable yard management work to be simulated. Yard simulators can be developed to optimize movement of trailers, yard truck, working associates, and/or other moving objects. Also computer systems/control units of yard management system can be made better by applying improved algorithms and yard layouts.

The disclosed systems may allow power accumulation to be achieved. Methods of recharging and refueling an autonomous yard truck without breaking the flow of operations can be developed, including how the autonomous yard truck is powered, refueled, and/or recharged.

The disclosed systems may enable parts for tasks to be optimized. Elements of the autonomous yard management system that become too good or not good enough because of automation, can be changed. For example, people may still need to drive the autonomous yard truck from time to time, but rather than a full cab. This might be done using remote controls.

The disclosed systems may allow unreliability to be compensated. Safeguards can be developed, such as triple backups, human and machine intervention, along with more mundane safeguards (e.g., cushions or bumpers) that allow elements to touch or account for the risk of human errors within the autonomous yard management system.

The disclosed system may allow the limitations that are ascribed to having humans in the loop to be removed. For example, by designing the autonomous yard truck to have two front ends, the yard truck can hook up to a trailer from either end without needing to turn around.

The disclosed systems may incorporate best of conventional yard management system into the disclosed yard systems herein. A dual system may be developed where some elements of the dual system are autonomous, such as the yard trucks. Other elements of the dual system are or may be manned, for example, a mix of autonomous and non-autonomous trucks.

The disclosed systems may allow continuous usefulness of the autonomous yard management system to be maintained. For example, the autonomous yard management system can be designed for 24/7 operations.

The disclosed systems may allow properties and data of the autonomous yard management system to be used. Movements of autonomous trucks and/or trailers can be tracked and recorded, so trailers are never misplaced or lost in the yard.

In some embodiments, the autonomous yard management system may include an autonomous wash bay. Cameras may be used to check an autonomous yard truck and trailer for dirtiness. How dirty an autonomous yard truck or trailer is may be inferred through, for example, optical recognition, image processing comparison, point cloud comparison, etc. Thresholds and conditions may also be set for when a truck or trailer should be sent to the wash bay, which can autonomously schedule the wash for the truck, and may also consider its other scheduled needs, such as docking, loading/unloading, maintenance, etc.

In some embodiments, the autonomous yard management system may include an autonomous docking mechanism. An existing docking system requires the use of chocks for trucks and trailers once they are parked in a loading dock, which is inherently inefficient. The autonomous yard management system disclosed herein can provide a locking mechanism, which may be autonomous, to secure the trailer or truck to the loading bay.

In some embodiments, the autonomous yard management system may include an autonomous maintenance station. An autonomous yard truck or a trailer may send, via for example wireless ECM/PCM devices, diagnostic codes and information to a maintenance database of the autonomous maintenance station. The autonomous maintenance station can schedule for autonomous maintenance of the autonomous yard truck or the trailer. For example, an appropriate department may be assigned for the maintenance task and the tools required for the scheduled maintenance can be ensured to be present.

In some embodiments, the autonomous yard management system may include an autonomous loading or unloading mechanism. Locking mechanisms for a trailer to be safely affixed to a docking station may be provided to replace the need for chocks being applied to the wheels of the trailer. A mechanism for the trailer or the yard truck backing up to the docking station can also be provided ensure that the trailer and the yard truck autonomously back up to a proper distance and an proper angle with respect to the docking station. For example, optics mounted to the docking station may send to the autonomous yard truck information on its position. The information can be used to correct the yard truck's and trailer's angle, distance, speed, etc. The information may be sent via a control module of the autonomous yard management system. Other means may also be employed to facilitate the docking, loading, and/or unloading, such as radio frequency (RF) sensors, Sonar, Lidar, Peer-Peer, Infrared, etc., that may be mounted to the autonomous yard truck, the trailer and/or the docking station.

In some embodiments, the autonomous yard management system may also include autonomous devices and/or mechanisms for localization of a trailer and a yard truck, hitching an autonomous yard truck to a trailer, connection of auxiliary cords of a yard truck and a trailer including cords for brake and lights, inspection of tires of the yard truck and/or the trailer, inspection of trailer, and/or inspection of coupling connection between the yard truck and the trailer.

In some embodiments, the autonomous yard management system may also include autonomous devices and/or mechanisms for determination of trailer's identification, and/or a yard truck to avoid other trucks, trailers, personnel, equipment, and other yard trucks. Mapping and planning for a yard truck and trailer system may be generated via optics (e.g., cameras) throughout the yard and/or beacon systems throughout the yard. For example, a global positioning system (GPS) may be employed to track the yard truck, which can dynamically adjust the routing and planning of connecting to a trailer, based on the vehicle's GPS location from trailers. This may be prioritized based on the following factors: priority & scheduling, temperature measurement of the load, bay or dock needs.

Figure 1:
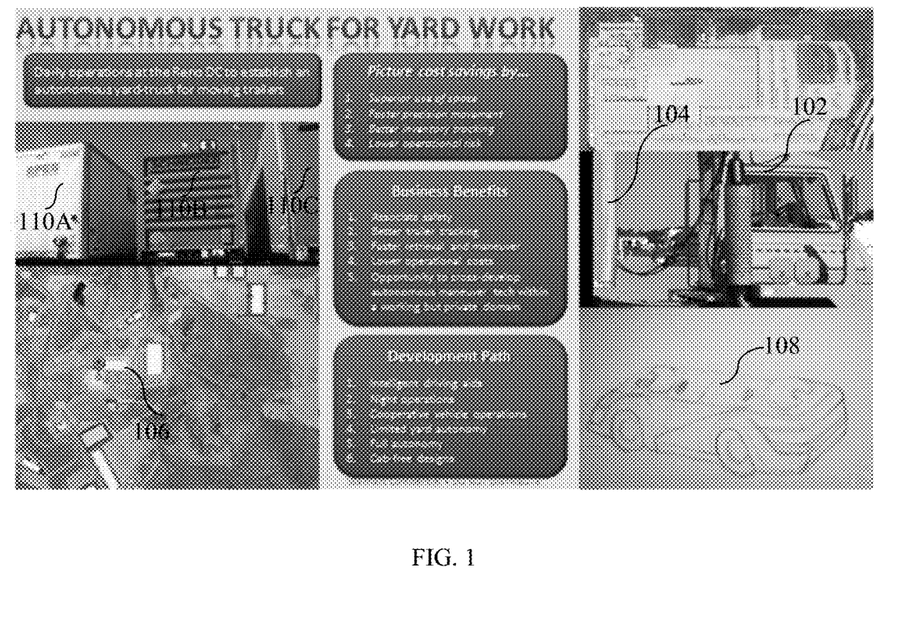
FIG. 1 illustrates a diagram of an example autonomous yard truck for moving trailers in a yard of a distribution center according to one example embodiment.

FIG. 1 illustrates a diagram of an example autonomous yard truck for moving trailers. As shown in FIG. 1, a tractor 102 hauling a trailer 104 may exit a highway and is ready to enter a yard of a distribution center 106. The tractor 102 may un-attach the trailer 104 at or near an entrance to the distribution center 106. An autonomous yard truck 108 may be dispatched, via a control unit/computer system of the distribution center 106, to move and store the trailer 104 in a proper location in the yard. The autonomous yard truck 108 may be instructed by the control unit and/or guided by a localization grid to automatically approach and couple the trailer 104. Upon coupling with the trailer 104, the autonomous yard truck 108 may move and park the trailer 104, via instructions received from the control unit, in an optimum location in the yard. As a result, trailers can be stored in the yard with a very small distance between one another while being safely parked, as shown by several parked trailers 110 (110A, 110B, and 110C). The very small distance may not be achieved in an existing conventional yard management system. The above description may also be applicable to a trailer that has arrived at the distribution center 106. The maneuvering of the trailer 104 by the yard truck 108 may be further facilitated by a plurality of sensors installed on the trailer 104, a plurality of sensors installed on the yard truck 108, and a plurality of sensors installed in the distribution center 106. Those sensors may communicate with each other and with the control module. Those sensors may be any type of sensor described above.

Figure 2:
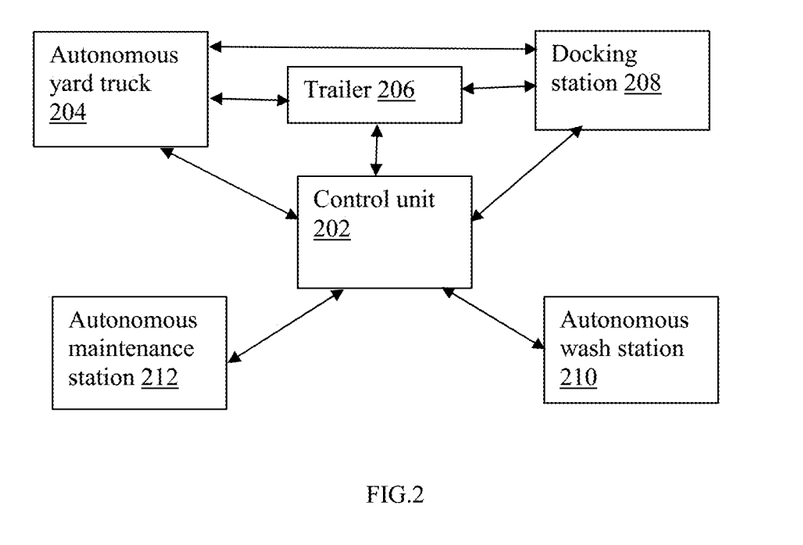
FIG. 2 illustrates a block diagram of an example autonomous system for managing a yard in which trailers are moved, stored, and/or docked by an autonomous yard truck according to one example embodiment.

As described above, autonomous yard trucks are dispatched to move trailers around a yard such as around a distribution center. The autonomous yard trucks can allow for precision parking of trailers in the yard. FIG. 2 illustrates a block diagram of an example autonomous system for managing a yard in which trailers are moved, stored, and/or docked by an autonomous yard truck.

As shown in FIG. 2, in a yard, a control module 202 (may also referred to as a yard computer system) may instruct, via a wired or wireless communication, an autonomous yard truck 204 to perform one or more tasks on a trailer 206. The control module 202 may have an application program installed thereon. Communications with the control module 202 may be achieved via the application program. The control module 202 may embody a remote control. For example, in the yard, the autonomous yard truck 204 may communicate with the yard computer system 202 to couple with the trailer 206. The autonomous yard truck 204 may also communicate, via a wired or wireless communication, with the trailer 206 to exchange, for example some information on relative positions of the autonomous truck 204 and the trailer 206. An auto-coupling between the autonomous yard truck 204 and the trailer 206 can be achieved through instructions received by both the autonomous yard truck 204 and the trailer 206 from the computer system 202, and may also be facilitated by communications between the autonomous yard truck 204 and the trailer 206. The autonomous coupling may include coupling of air and electrical lines from the autonomous yard truck 204 to the trailer 206, for example, using small AGV's to accomplish the coupling connections.

The control unit 202 may also instruct the autonomous yard truck 204 to move the attached trailer 206 as needed, for example, to park the trailer 206 at an available parking spot in the yard, or to dock the trailer 206 into a docking station 208 for loading/unloading the trailer 206. This example system may allow for a "live load" where the truck 204 and the trailer 206 remain connected and the trailer 206 gets unloaded and then re-loaded, which makes a more efficient turn around at the DC. To dock the trailer 206 into the docking station 208, the truck 204 and the trailer 206 may communicate directly with the docking station 208, in addition to instructions and communications received from and transmitted to the control unit 202 by the truck 204, the trailer 206 and the docking station 208. An automated dock lock system may be provided to interface with the autonomous yard truck 204 and the control unit 202 to secure the trailer 206 to the docking station 208. Further, the yard truck 204 may be instructed by the control unit 202 or self-instructed to sense and avoid people, other trailers and other obstacles during performing a task on the trailer 206.

To facilitate performing tasks by the yard truck 204, magnetic strips may be distributed in the yard to guide the yard truck 204. A localization grid may also be installed in the yard to guide movement of the yard truck 204. The localization grid may include various sensors, and corresponding sensors may also be installed on the yard truck 204, the trailer 206, and the docking station 208. In such a way, locations, orientations (angles), and/or directions of movements of the yard truck 204, the trailer 206, and the docking station 208 can be determined to coordinate the movement of the truck 204 and the trailer 206. For example, sensors may be installed on each corner of the truck 204, the trailer 206, and the docking station 208. One sensor may be used for movement direction control. One sensor may be needed if the trailers 206 are all the same size.

Sensors can also be used to sense and prevent the yard truck 204 and the trailer 206 from colliding with other objects that are not on the localization grid, for example, people walking in the yard. The sensors used herein can be any kind of sensor known in the art, for example, laser-based sensors, acoustics-based sensors, or radio-frequency based sensors.

In some embodiments, the yard truck 204 may also perform additional tasks such as: tracking trailers 206, inventory management, security monitoring, etc.

In some embodiments, the autonomous yard truck 204 may also need to interface with an automatic wash bay 210. The autonomous wash station 210 may be configured to automatically wash the autonomous yard truck 204 and the trailer 206. The communications between the truck 204 and the wash station 210 may be transmitted and relayed via the control unit 202. Video analytics for trailer and truck inspection may be required to determine when washing of the truck 204 and the trailer 206 is in order.

In some embodiments, the truck 204 and/or the trailer 206 may send codes to the control unit 202 related to identified maintenance issues of the truck 204 and the trailer 206. The maintenance issues may be stored in a database and acted upon in a hierarchical manner according to rules. The maintenance of the truck 204 and the trailer 206 may be performed at an autonomous maintenance station 212. The autonomous maintenance station 212 may be configured to automatically maintain the autonomous yard truck 204 and/or the trailer 206.

In some embodiments, automated connections of the air and electrical lines from the trailer 206 to the yard truck 204 may be achieved via vacuum techniques, pneumatic techniques, and/or hydraulic techniques. For example, the trailer 206 can have a pneumatic or hydraulic-powered landing gear. A sensor in a proximity of the landing gear may detect approaching of a coupling device of the truck 204. The landing gear may then automatically raise or lower the trailer 206 such that a pin (e.g., a king-post) beneath the trailer 206 can automatically be received by the coupling device (e.g., a fifth-wheel) of the truck 204. The air and electrical lines can be enclosed in a casing having male and female connectors inside the king-post and the fifth wheel, such that the male and female connectors can be automatically coupled.

In some embodiments, reservoir air containers may be added to the trailer 206, which may be used to release the air brakes on a trailer. A small battery may be provided to power a 12-volt solenoid for wirelessly releasing and setting the air brakes on the trailer 206. In such a case, connections of the air and electrical lines from the trailer 206 to the yard truck 204 may be eliminated.

As used herein, a trailer may refer to an unpowered vehicle towed or pushed by a powered vehicle, and may include container trailers, recreational vehicles, travel trailers, or mobile homes. A trailer hitch, a trailer coupler, fifth-wheel coupling or other type of tow hitch may be needed to tow or push a trailer by a car, truck or other traction engine. For example, the trailer may be raised and lowered such that the trailer's pin is able to drop into the central hole of the fifth wheel of a towing truck.

Figure 3:
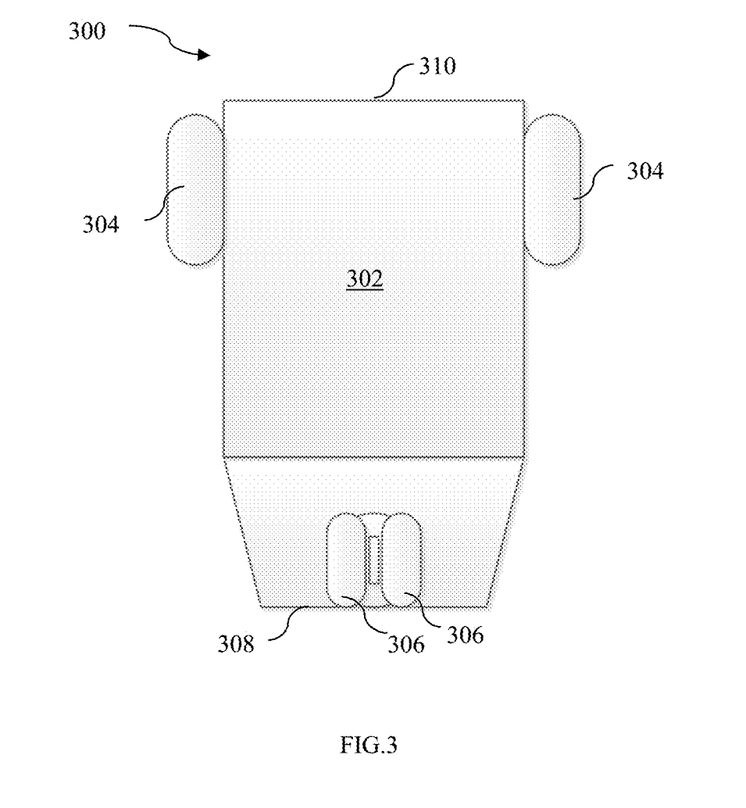
FIG. 3 illustrates a bottom view of an example autonomous cab-less yard truck according to an example embodiment.

FIG. 3 illustrates a bottom view of an example autonomous cab-less yard truck 300 according to one example embodiment. As shown in FIG. 3, the truck 300 may include a body 302 without a cab. The truck 300 may also include two side wheels 304 attached to both sides of the body 302, respectively. The truck 300 may further include underneath wheels 306 attached to the underside of the body 302. The truck 300 may further have a first end 308 including a first trailer hookup and a second end 310 including a second trailer hookup, such that a trailer may be moved via either the first trailer hookup or the second trailer hookup without turning around the cab-less truck 300.

Figure 4:
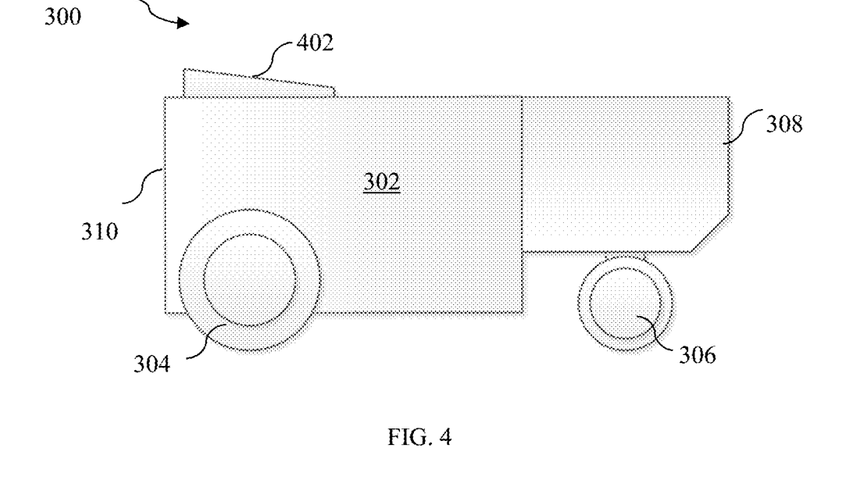
FIG. 4 illustrates a side view of the example autonomous cab-less yard truck of FIG. 3 according to one embodiment.

FIG. 4 illustrates a side view of the example autonomous cab-less yard truck 300 according to one example embodiment. As shown in FIG. 4, the truck 300 may further include a module 402 that may be attached to or built into the body 302. The module 402 may include power management and onboard computer system, as well as a coupling mechanism for coupling the truck 300 to a trailer.

Figure 5:
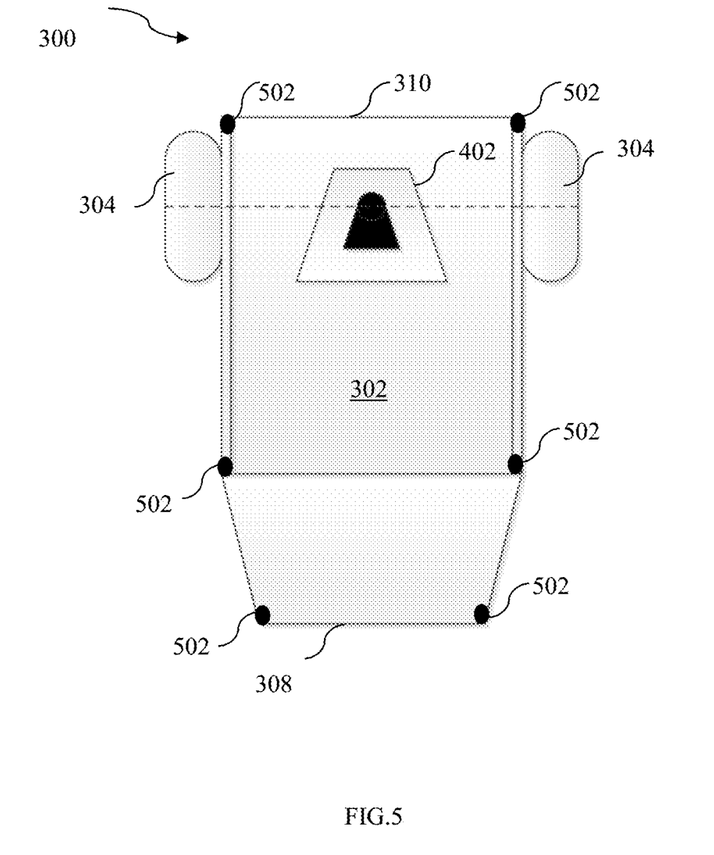
FIG. 5 illustrates a top view of the example autonomous cab-less yard truck of FIG. 3 according to one embodiment.

FIG. 5 illustrates a top view of the example autonomous cab-less yard truck 300 according to one example embodiment. As shown in FIG. 5, the truck 300 may further include one or more sensors 502 that may be attached to or built into the body 302. The sensors 502 may be the same type of sensors or may be different types of sensors. The sensors 502 may include, but are not limited to: optical sensors, cameras, video recording sensors, radio frequency sensors, Sonar, Lidar, peer-peer sensors, or infrared sensors. The sensors 502 may further be categorized as a first set of sensors configured for positioning the autonomous yard truck in the vehicle storage area, a second set of sensors configured for maneuvering the trailer, and a third set of sensors configured for preventing the autonomous truck from colliding with an object. The object may include one or more of: other autonomous yard trucks, other trailers, persons in the vehicle storage area, or equipment in the vehicle storage area.

The first set of sensors may be further configured to determine a location of the autonomous yard truck with respect to an angle and a trajectory in the vehicle storage area. The first set of sensors may also include sensors receiving information from a global positioning system (GPS). The second set of sensors may be further configured to perform one or more of: lining up the autonomous yard truck on the trailer, lining the trailer up to a docking station, and parking the trailer.

Figure 6:
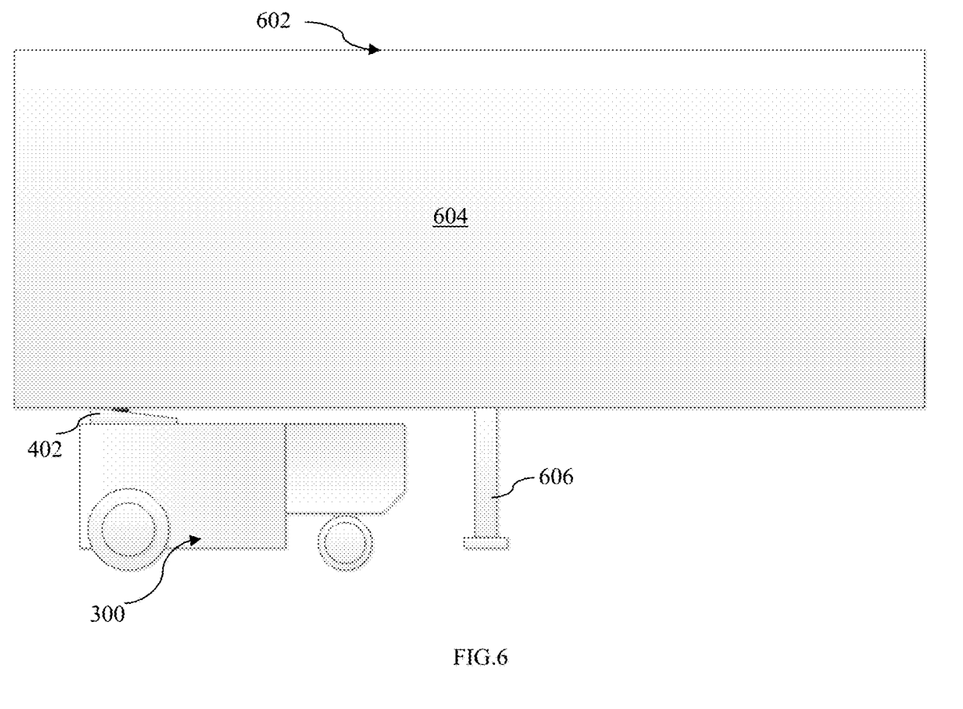
FIG. 6 illustrates a side view of the example autonomous cab-less yard truck driving a trailer according to one example embodiment.

FIG. 6 illustrates a side view of the example autonomous cab-less yard truck 300 driving a trailer 602 according to one example embodiment. As shown in FIG. 6, the truck 300 is coupled, via the coupling device in the module 402, to the trailer 602 to drive the trailer 602. The trailer 602 may include a trailer body 604 and a landing gear 606 (e.g., one or more legs to support the trailer 602 when the trailer 602 is unattached from the yard truck 300). Again, the landing gear 606 may be able to extend or retract to raise or lower the trailer 602 by means of, for example, a hydraulic or pneumatic mechanism.

The trailer 602 may include one or more sensors that may be attached to or built into the body 604. Those sensors may be used to provide information on location, orientation, direction of the trailer 602 and to guide the trailer 602 and the truck 300 to couple with and to dock into a docking station, via communications with the control module 202 and/or direction communications between the trailer 602, the truck 300, and the docking station. The sensors may be the same type of sensors or may be different types of sensors. The sensors may include, but are not limited to: optical sensors, cameras, video recording sensors, radio frequency sensors, Sonar, Lidar, peer-peer sensors, or infrared sensors. The sensors may further be categorized as a first set of sensors configured to position the trailer in the vehicle storage area, a second set of sensors configured to maneuver the trailer, and a third set of sensors configured to prevent the trailer from colliding with an object. The object may include one or more of: other autonomous yard trucks, other trailers, persons in the vehicle storage area, or equipment in the vehicle storage area.

Figure 7:
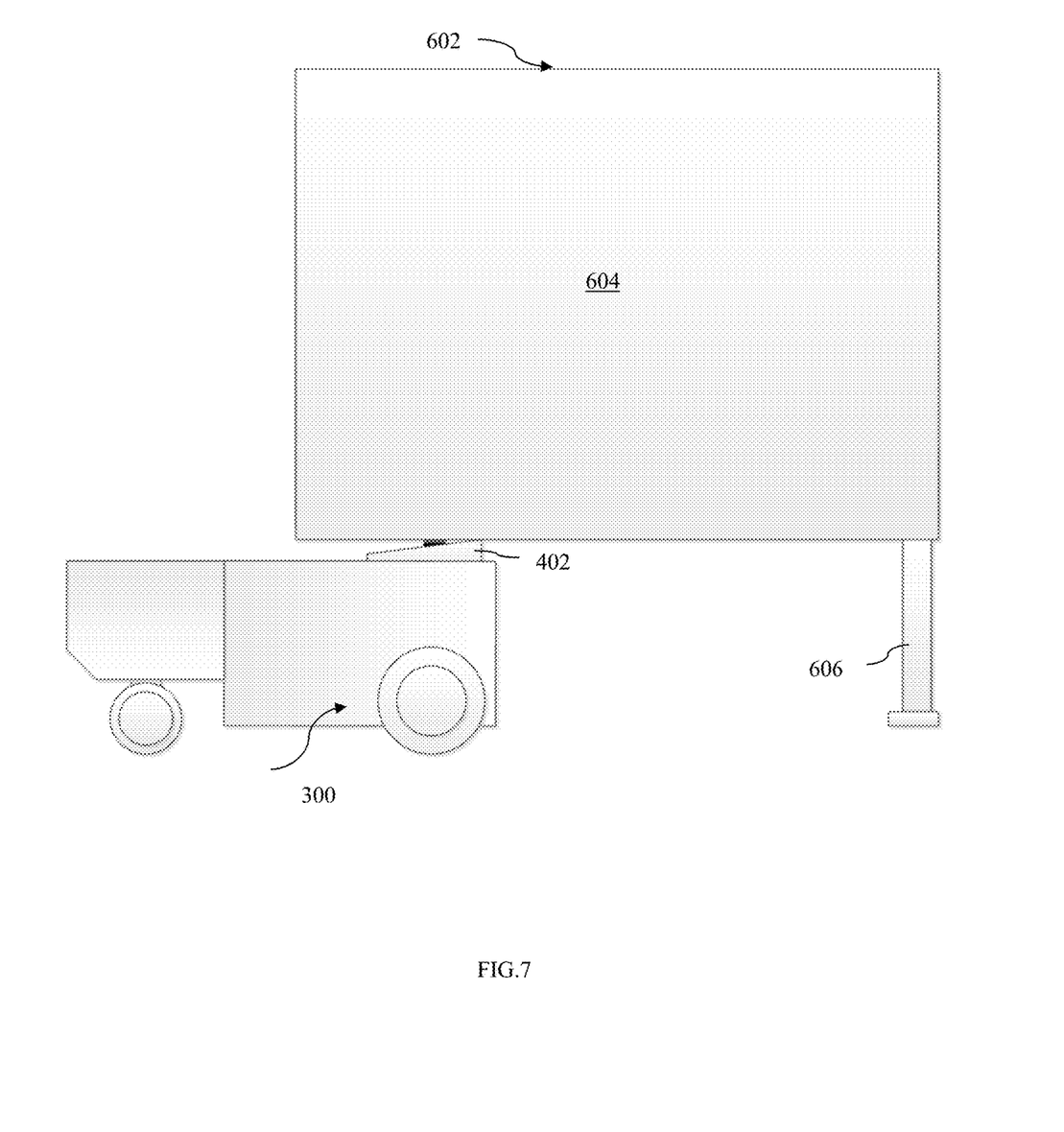
FIG. 7 illustrates a side view of the example autonomous cab-less yard truck backing the trailer according to one example embodiment.

FIG. 7 illustrates a side view of the example autonomous cab-less yard truck 300 backing the trailer 602 according to one example embodiment. As shown in FIG. 7, the truck 300 is coupled, via the coupling device in the module 402, to the trailer 602 to back/park the trailer 602 to, for example a docking station. Upon finishing the task, the trailer 602 may be decoupled from the truck 300, and the landing gear 606 may extend to secure and/or support the trailer 602.

Figure 8:
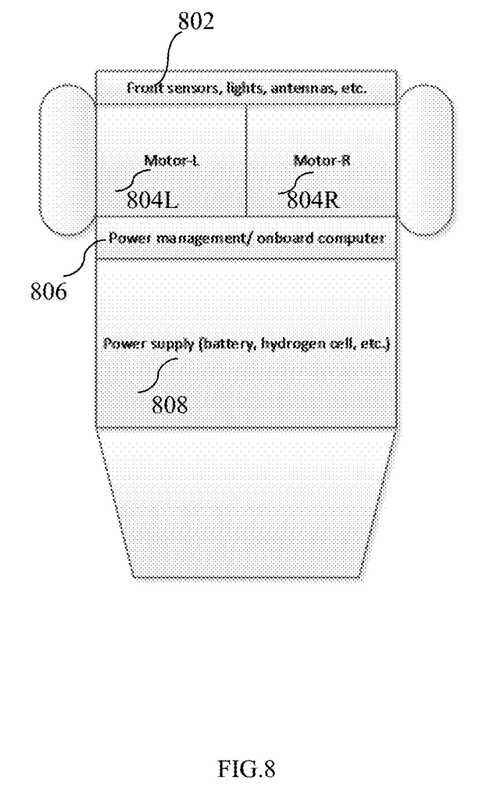
FIG. 8 illustrates a cutaway top view of the example autonomous cab-less yard truck according to one example embodiment.

FIG. 8 illustrates a cutaway top view of the example autonomous cab-less yard truck 300 according to one example embodiment. As shown in FIG. 8, the truck 300 may further include one or more modules 802 for sensors, lights, and antennas; a left motor 804L; a right motor 804R; a module 806 for power management/onboard computer; and a power supply 808 that may include batteries, and/or hydrogen cells.

Another exemplary autonomous system for managing a vehicle storage area may also be provided. The autonomous system may include an autonomous cab-less yard truck having an application program installed thereon and configured to communicate with a control module via the application program to maneuvering a trailer, wherein the autonomous cab-less yard truck is further configured to have a first end including a first trailer hookup and a second end including a second trailer hookup, such that the trailer is coupled with the autonomous yard truck via either the first trailer hookup or the second trailer hookup without turning around the autonomous cab-less yard truck; a first set of sensors configured to detect positions the autonomous cab-less yard truck in the vehicle storage area; a second set of sensors configured to facilitate maneuvering the trailer; and a third set of sensors configured to prevent the autonomous cab-less yard truck from colliding with an object. The autonomous may further include a control module having an application program installed thereon and configured to communicate, via the application program installed thereon, with the autonomous cab-less yard truck, wherein the control module instructs and facilitates the autonomous cab-less yard truck to move, dock, and/or store the trailer in the vehicle storage area, based on the first, second, and third sets of sensors installed on the autonomous cab-less yard truck; and a plurality set of sensors installed in the vehicle storage area configured to communicate with the control module and the sensors installed on the autonomous cab-less truck for facilitating the autonomous cab-less truck to maneuvering the trailer.

Figure 9:
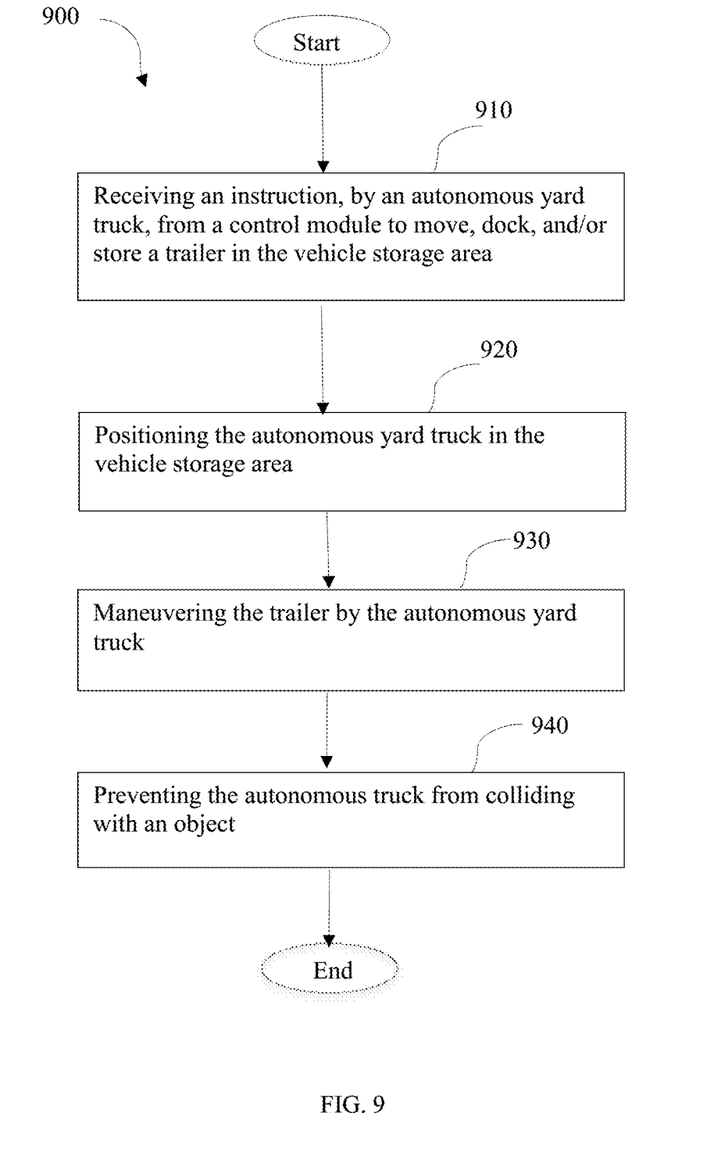
FIG. 9 illustrates an example method for automatically managing a vehicle storage area according to one example embodiment.

Methods for automatically managing a vehicle storage area are also provided in this disclosure. FIG. 9 illustrates an example method 900 for automatically managing a vehicle storage area. The method 900 may be implemented in the above described system and may include the following steps.

In step 910, a trailer may be detected at a first location of the vehicle storage area and is ready to be positioned in a second location in the vehicle storage area. An instruction is received, by an autonomous yard truck, from a control module to move the trailer, dock the trailer, and/or store the trailer in the second location in the vehicle storage area. The detection of the trailer may be performed by the control module, based on a plurality of sensors installed on the trailer and a plurality of sensors installed in the vehicle storage area. The control module may have an application program installed thereon for communicating with the plurality of sensors installed on the trailer and the plurality of sensors installed in the vehicle area. The trailer and the vehicle storage area may each be provided a communication module therein for facilitating the communications among the control module, the plurality of sensors installed on the trailer, and the plurality of sensors installed in the vehicle storage area.

In step 920, a position of the autonomous yard truck is located in the vehicle storage area. The position of the autonomous yard truck may be determined, based on based on the instruction and a plurality of sensors installed on the autonomous cab-less yard truck. The application program installed on the control module may be used to communicate with the plurality of sensors installed on the yard truck. In addition, an application program may also be installed on the yard truck to facilitate the communications between the control module and the plurality of sensors installed on the yard truck.

In step 930, the trailer is maneuvered by the autonomous yard truck. The autonomous yard truck is instructed to engage the trailer. The trailer may be moved around the vehicle storage area, parked in the vehicle storage area, and docked into a docking station, by the autonomous yard truck. The maneuvering may be based on the instruction, the plurality of sensors installed on the autonomous cab-less yard truck, and the plurality of sensors installed on the trailer.

In step 940, the autonomous truck is controlled to prevent colliding with an object. The object may include one or more of: other autonomous yard trucks, other trailers, persons in the area, or equipment in the vehicle storage area. The control may be performed based on the instruction, the plurality of sensors installed on the autonomous cab-less yard truck, the plurality of sensors installed on the trailer, and the plurality of sensors installed in the vehicle storage area.

The autonomous yard truck can be a cab-less truck having a first end including a first trailer hookup and a second end including a second trailer hookup, such that the trailer is moved via either the first trailer hookup or the second trailer hookup without turning around the cab-less truck. The plurality of sensor installed on the autonomous yard truck may include a first set of sensors configured for positioning the autonomous yard truck in the vehicle storage area; a second set of sensors configured for maneuvering the trailer; and a third set of sensors configured for preventing the autonomous truck from colliding with the object.

In some embodiments, the method 900 may further include determining, via the first set of sensors, a location of the autonomous cab-less yard truck with respect to an angle and a trajectory in the area.

In some embodiments, the method 900 may further include performing, via the second set of sensors, one or more of: lining up the autonomous cab-less yard truck on the trailer, lining the trailer up to a docking station, and parking the trailer.

The first set of sensors may include sensors receiving information from a global positioning system (GPS). The second set of sensors may include one or more of: optical sensors, cameras, video recording sensors, radio frequency sensors, Sonar, Lidar, peer-peer sensors, or infrared sensors. The third set of sensors may include one or more of: optical sensors, cameras, video recording sensors, radio frequency sensors, Sonar, Lidar, peer-peer sensors, or infrared sensors.

In some embodiments, the method 900 may further include automatically washing the autonomous cab-less yard truck and/or the trailer at an autonomous wash station.

In some embodiments, the method 900 may further include automatically maintaining the autonomous cab-less yard truck and/or the trailer at an autonomous maintenance station.

Figure 10:
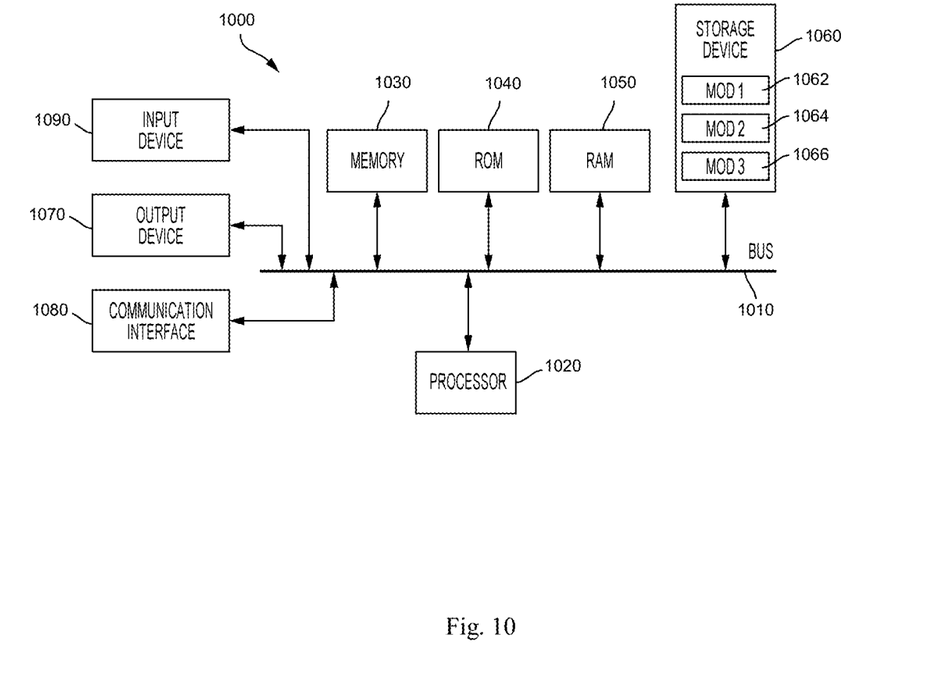
FIG. 10 illustrates an example computer system which can be used to perform the systems and methods for automatically managing a vehicle storage area according to one example embodiment.

FIG. 10 illustrates an example computer system 1000 which can be used to perform the systems and methods for automatically managing a vehicle storage area as disclosed herein. The exemplary system 1000 can include a processing unit (CPU or processor) 1020 and a system bus 1010 that couples various system components including the system memory 1030 such as read only memory (ROM) 1040 and random access memory (RAM) 1050 to the processor 1020. The system 1000 can include a cache of high speed memory connected directly with, in close proximity to, or integrated as part of the processor 1020. The system 1000 copies data from the memory 1030 and/or the storage device 1060 to the cache for quick access by the processor 1020. In this way, the cache provides a performance boost that avoids processor 1020 delays while waiting for data. These and other modules can control or be configured to control the processor 1020 to perform various actions. Other system memory 1030 may be available for use as well. The memory 1030 can include multiple different types of memory with different performance characteristics. It can be appreciated that the disclosure may operate on a computing device 1000 with more than one processor 1020 or on a group or cluster of computing devices networked together to provide greater processing capability. The processor 1020 can include any general purpose processor and a hardware module or software module, such as module 1 1062, module 2 1064, and module 3 1066 stored in storage device 1060, configured to control the processor 1020 as well as a special-purpose processor where software instructions are incorporated into the actual processor design. The processor 1020 may essentially be a completely self-contained computing system, containing multiple cores or processors, a bus, memory controller, cache, etc. A multi-core processor may be symmetric or asymmetric.

The system bus 1010 may be any of several types of bus structures including a memory bus or memory controller, a peripheral bus, and a local bus using any of a variety of bus architectures. A basic input/output (BIOS) stored in ROM 1040 or the like, may provide the basic routine that helps to transfer information between elements within the computing device 1000, such as during start-up. The computing device 1000 further includes storage devices 1060 such as a hard disk drive, a magnetic disk drive, an optical disk drive, tape drive or the like. The storage device 1060 can include software modules 1062, 1064, 1066 for controlling the processor 1020. Other hardware or software modules are contemplated. The storage device 1060 is connected to the system bus 1010 by a drive interface. The drives and the associated computer-readable storage media provide nonvolatile storage of computer-readable instructions, data structures, program modules and other data for the computing device 1000. In one aspect, a hardware module that performs a particular function includes the software component stored in a tangible computer-readable storage medium in connection with the necessary hardware components, such as the processor 1020, bus 1010, display 1070, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 1000 is a small, handheld computing device, a desktop computer, or a computer server.

Although the exemplary embodiment described herein employs the hard disk 1060, other types of computer-readable media which can store data that are accessible by a computer, such as magnetic cassettes, flash memory cards, digital versatile disks, cartridges, random access memories (RAMs) 1050, and read only memory (ROM) 1040, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1000, an input device 1090 represents any number of input mechanisms, such as a microphone for speech, a touch-sensitive screen for gesture or graphical input, keyboard, mouse, motion input, speech and so forth. An output device 1070 can also be one or more of a number of output mechanisms known to those of skill in the art. In some instances, multimodal systems enable a user to provide multiple types of input to communicate with the computing device 1000. The communications interface 1080 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. An autonomous system for managing a vehicle storage area, the autonomous system comprising:
   a control module having an application program installed thereon and configured to communicate, via the application program, with an autonomous cab-less yard truck, wherein the control module instructs and facilitates the autonomous cab-less yard truck to move, dock, and/or store a trailer in the vehicle storage area; and
   the autonomous cab-less yard truck comprising:
   a first end including a first trailer hookup and a second end including a second trailer hookup, such that the trailer is coupled with the autonomous yard truck via either the first trailer hookup or the second trailer hookup without turning around the autonomous cab-less yard truck;
   an application program installed thereon and configured to communicate with the control module via the application program installed on the control module;
   a first set of sensors configured to detect positions of the autonomous cab-less yard truck in the vehicle storage area;
   a second set of sensors configured to facilitate maneuvering the trailer; and
   a third set of sensors configured to prevent the autonomous cab-less yard truck from colliding with an object,
   wherein the first, second, and third sets of sensors are further configured to communicate, via the application program installed on the yard truck, with sensors installed in the vehicle storage area.

2. The system of claim 1, wherein the first set of sensors are further configured to determine a location of the autonomous cab-less yard truck with respect to an angle and a trajectory in the vehicle storage area.

3. The system of claim 1, wherein the second set of sensors are further configured to facilitate performing one or more of: lining up the autonomous cab-less yard truck on the trailer, lining the trailer up to a docking station, and parking the trailer.

4. The system of claim 1, wherein the first set of sensors includes sensors receiving information from a global positioning system (GPS).

5. The system of claim 1, wherein the second set of sensors includes one or more of: optical sensors, cameras, video recording sensors, radio frequency sensors, Sonar, Lidar, peer-peer sensors, or infrared sensors.

6. The system of claim 1, wherein the third set of sensors includes one or more of: optical sensors, cameras, video recording sensors, radio frequency sensors, Sonar, Lidar, peer-peer sensors, or infrared sensors.

7. The system of claim 1, wherein the control module is a remote control.

8. The system of claim 1, further comprising an autonomous wash station configured to automatically wash the autonomous cab-less yard truck and/or the trailer.

9. The system of claim 1, further comprising an autonomous maintenance station configured to automatically maintain the autonomous cab-less yard truck and/or the trailer.

10. The system of claim 1, wherein the object includes one or more of: other autonomous yard trucks, other trailers, persons in the vehicle storage area, or equipment in the vehicle storage area.

11. A method for automatically managing a vehicle storage area, the method comprising:
   detecting when a trailer is at a first location of the vehicle storage area and is ready to be positioned in a second location in the vehicle storage area;
   receiving an instruction, by an autonomous cab-less yard truck, from a control module to move the trailer, dock the trailer, and/or store the trailer in the second location in the vehicle storage area;
   positioning, based on the instruction and a plurality of sensors installed on the autonomous cab-less yard truck, the autonomous cab-less yard truck in the vehicle storage area;
   maneuvering, based on the instruction, the plurality of sensors installed on the autonomous cab-less yard truck, and a plurality of sensors installed on the trailer, the trailer by the autonomous cab-less yard truck; and
   preventing, based on the instruction and the plurality of sensors installed on the autonomous cab-less yard truck, the autonomous cab-less yard truck from colliding with an object,
   wherein the autonomous cab-less yard truck comprising:
      a first end including a first trailer hookup and a second end including a second trailer hookup, such that the trailer is coupled with the autonomous cab-less yard truck via either the first trailer hookup or the second trailer hookup without turning around the autonomous cab-less yard truck; and
      the plurality of sensors installed on the autonomous cab-less yard truck include:
         a first set of sensors configured for positioning the autonomous cab-less yard truck in the vehicle storage area;
         a second set of sensors configured for maneuvering the trailer; and
         a third set of sensors configured for preventing the autonomous cab-less yard truck from colliding with the object.

12. The method of claim 11, further comprising determining, via the first set of sensors, a location of the autonomous cab-less yard truck with respect to an angle and a trajectory in the area.

13. The method of claim 11, further comprising performing, via the second set of sensors, one or more of: lining up the autonomous cab-less yard truck on the trailer, lining the trailer up to a docking station, and parking the trailer.

14. The method of claim 11, wherein the first set of sensors includes sensors receiving information from a global positioning system (GPS).

15. The method of claim 11, wherein the second set of sensors includes one or more of: optical sensors, cameras, video recording sensors, radio frequency sensors, Sonar, Lidar, peer-peer sensors, or infrared sensors.

16. The method of claim 11, wherein the third set of sensors includes one or more of: optical sensors, cameras, video recording sensors, radio frequency sensors, Sonar, Lidar, peer-peer sensors, or infrared sensors.

17. The method of claim 11, wherein the control module is a remote control.

18. The method of claim 11, further automatically washing the autonomous cab-less yard truck and/or the trailer at an autonomous wash station.

19. The method of claim 1, further comprising automatically maintaining the autonomous cab-less yard truck and/or the trailer at an autonomous maintenance station.

20. An autonomous system for managing a vehicle storage area, the autonomous system comprising:
   an autonomous cab-less yard truck having an application program installed thereon and configured to communicate with a control module via the application program to maneuvering a trailer, wherein the autonomous cab-less yard truck is further configured to have a first end including a first trailer hookup and a second end including a second trailer hookup, such that the trailer is coupled with the autonomous yard truck via either the first trailer hookup or the second trailer hookup without turning around the autonomous cab-less yard truck; a first set of sensors configured to detect positions the autonomous cab-less yard truck in the vehicle storage area; a second set of sensors configured to facilitate maneuvering the trailer; and a third set of sensors configured to prevent the autonomous cab-less yard truck from colliding with an object;
   a control module having an application program installed thereon and configured to communicate, via the application program installed thereon, with the autonomous cab-less yard truck, wherein the control module instructs and facilitates the autonomous cab-less yard truck to move, dock, and/or store the trailer in the vehicle storage area, based on the first, second, and third sets of sensors installed on the autonomous cab-less yard truck; and
   a plurality set of sensors installed in the vehicle storage area configured to communicate with the control module and the sensors installed on the autonomous cab-less truck for facilitating the autonomous cab-less truck to maneuvering the trailer.

* * * * *